Figure 1:
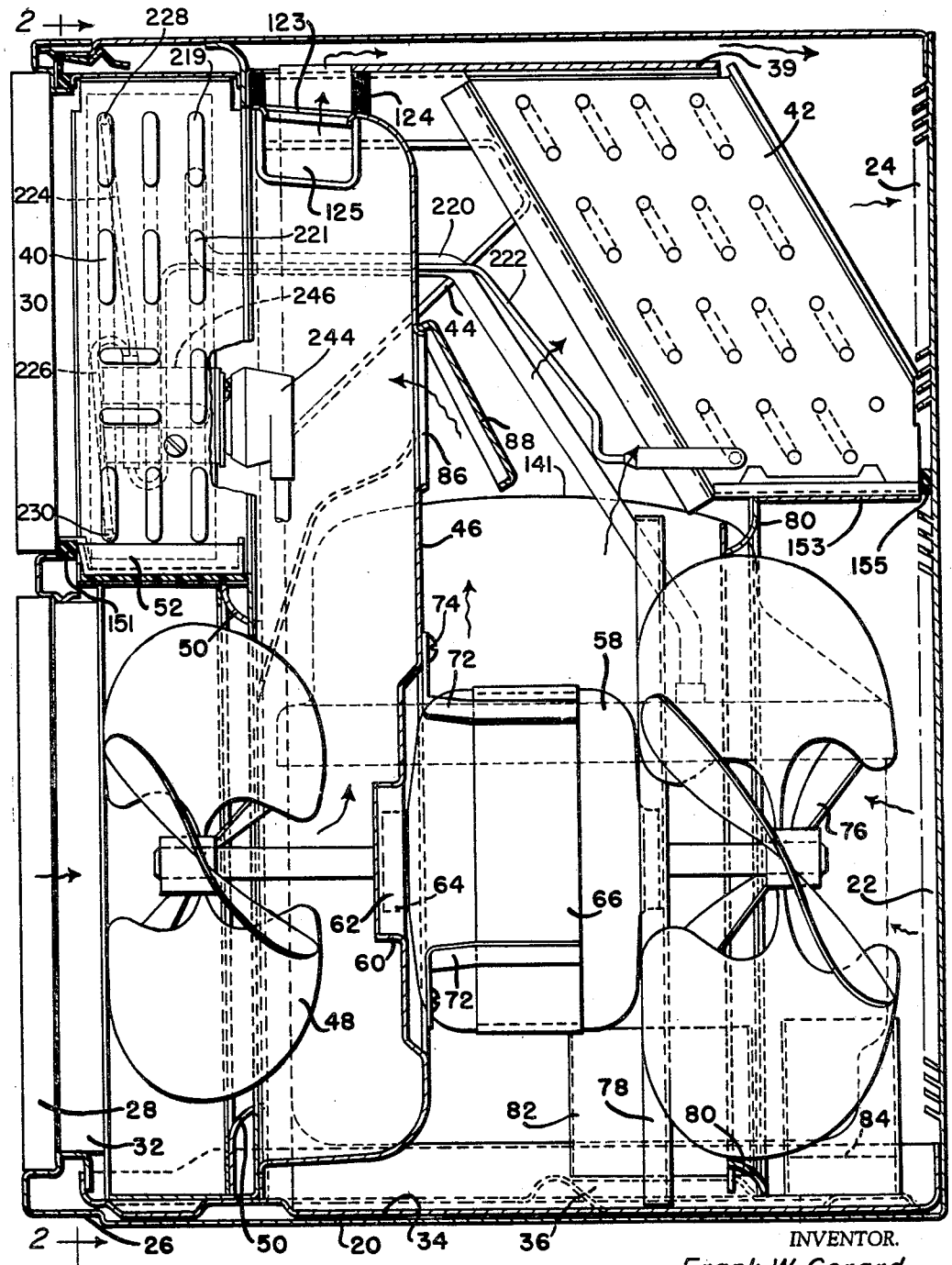

INVENTOR.
Frank W. Gerard
BY
Carl A. Stickel
His Attorney

July 17, 1962 F. W. GERARD 3,044,271
REFRIGERATING APPARATUS INCLUDING MEANS
TO PREVENT EXCESSIVE FROSTING
Filed Oct. 19, 1959 3 Sheets-Sheet 2

INVENTOR.
Frank W. Gerard
BY
His Attorney

July 17, 1962  F. W. GERARD  3,044,271
REFRIGERATING APPARATUS INCLUDING MEANS
TO PREVENT EXCESSIVE FROSTING
Filed Oct. 19, 1959  3 Sheets-Sheet 3
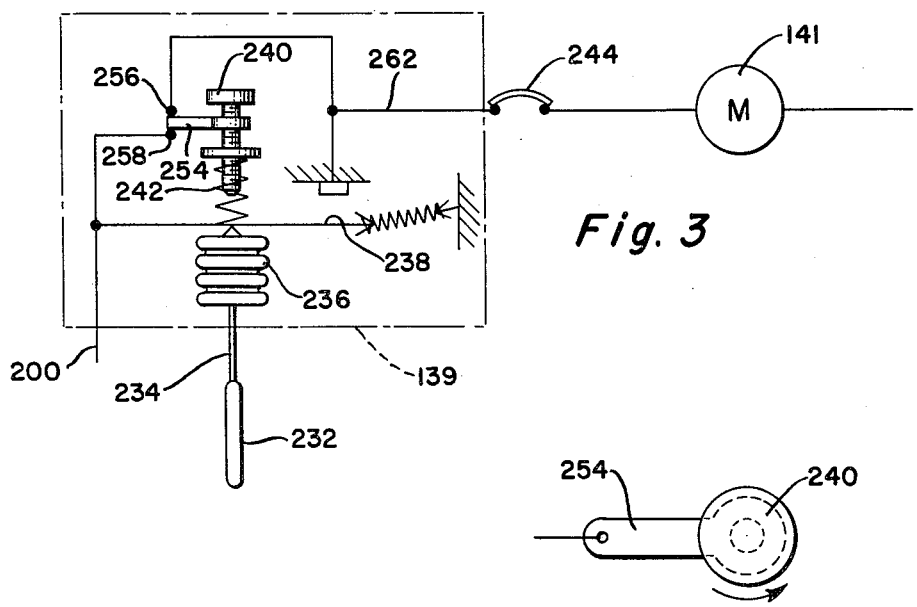
*Fig. 3*
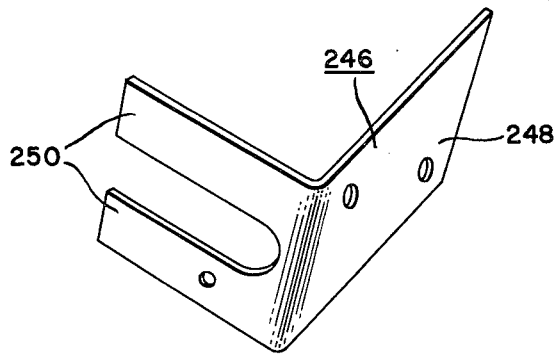
*Fig. 4*
*Fig. 5*
INVENTOR.
Frank W. Gerard
BY
His Attorney

# United States Patent Office 3,044,271
Patented July 17, 1962

3,044,271
REFRIGERATING APPARATUS INCLUDING
MEANS TO PREVENT EXCESSIVE FROSTING
Frank W. Gerard, Dayton, Ohio, assignor to General
Motors Corporation, Detroit, Mich., a corporation of
Delaware
Filed Oct. 19, 1959, Ser. No. 847,304
2 Claims. (Cl. 62—150)

This invention pertains to refrigerating apparatus and especially to means for preventing the excessive frosting of air conditioning evaporators.

When air conditioning apparatus is provided with a compressor of ample capacity, there is a danger that under certain conditions of operation, particularly certain temperature and humidity conditions, that frost and ice will form between the fins of the evaporator and eventually stop the air flow. This renders the conditioner practically ineffective.

It is an object of this invention to provide a simple effective economical means for preventing the excessive frosting of air conditioning evaporators.

It is another object of this invention to provide a simple effective economical means for operating an air conditioning system at maximum capacity without excessive frosting of the evaporator and without regard to the air temperature to achieve maximum reduction of the humidity of the air.

It is another object of this invention to provide a simple effective economical means for preventing operation of the motor-compressor unit of an air conditioner whenever the evaporator is approaching temperatures below which excessive frost might accumulate on the evaporator.

These and other objects are attained in the form shown in the drawings in which a tubular cross finned evaporator has upper and lower banks of tubing in which liquid refrigerant is fed from capillary tubing into the top and bottom tubes adjacent the front outlet face and flows rearwardly therefrom discharging into a common manifold adjacent the rear air entrance face. An L-shaped bracket has a forked end fitting between fins or a fin and the adjacent end plate which also acts as a fin. Mounted on the other leg of the bracket is a thermostatic switch connected in series with the motor-compressor unit for stopping the motor-compressor unit whenever the temperature of the thermostat reaches a temperature indicating that the evaporator is approaching excessive frosting conditions. The thermostat will reclose at a high temperature, such as 64° F. The temperature of the air and the evaporator affect this thermostat to allow maximum cooling without excessive frosting. If desired, an adjustable thermostat responsive to the temperature of the room air may be connected in series with this limiter thermostat mounted on the evaporator. At one point in the range of adjustment of the room air thermostat, an additional arrangement is provided for shunting or preventing the opening of this room air thermostat to provide for continuous operation of the motor-compressor unit until the limiter thermostat opens and thereafter cycling on the limiter thermostat. This provides a maximum dehumidification regardless of air temperature.

Further objects and advantages of the present invention will be apparent from the following description, reference being had to the accompanying drawings wherein a preferred embodiment of the present invention is clearly shown.

Figure 2:
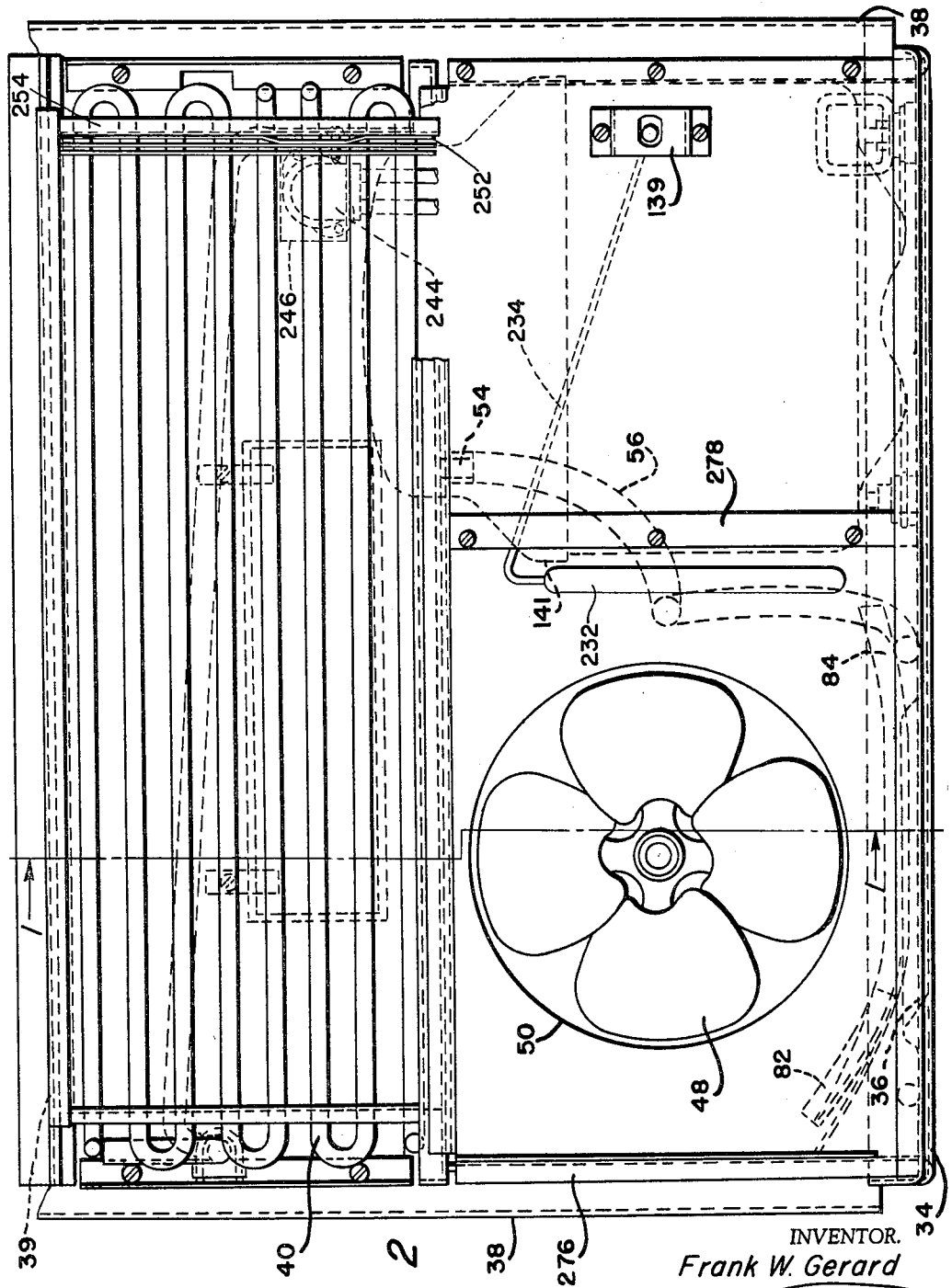

In the drawings:
FIGURE 1 is a vertical sectional view of an air conditioner embodying one form of my invention taken along the line 1—1 of FIGURE 2;
FIGURE 2 is a vertical sectional view taken along the line 2—2 of FIGURE 1;
FIGURE 3 is a wiring diagram of the compressor motor and its controls embodying my invention diagrammatically illustrated;
FIGURE 4 is a top view of the room thermostat control knob and its shunting switch; and
FIGURE 5 is a perspective view of the L-shaped mounting bracket for the limiter switch.

The air conditioner includes a casing 20 having imperforate top, bottom and side walls and provided with a lower set of louvers 22 on its back side exposed to the outside air and an upper set of louvers 24 also on its back side located above the louvers 22. The front of the cabinet is provided with a removable frame 26 which supports the room air inlet grille 28 and the room air discharge grille 30. An air filter 32 may be provided behind the room air inlet grille 28.

The chassis of the refrigerator system includes a base 34 having a shallow wall 36 for receiving condensate. Extending upwardly from the base 34 are the imperforate side walls and supports 38 which support the evaporator 40 immediately behind the grille 30 and the condenser 42 aligned with the louvers 24.

The condenser 42 has a horizontal support 153 beneath which drains into the well 36. Extending between the backside of the casing 20 and the support 153 between the lower and upper louvers 22 and 24 is a sealing gasket 155 of sponge rubber to prevent air discharged out of the condenser from leaking back into the cabinet. The condenser 42 is supported at the oppostie ends by the brackets 44 resting upon the upper side edges of the pan-shaped partition wall 46. This pan-shaped partition wall 46 is supported by the base 34 and the vertical side walls 38. It has a rounded pan-shape so as to guide the air drawn in through the room air inlet grille 28 and the filter 32 by the evaporator fan 48 and forced upwardly into the rear of the evaporator 40. The air flows forwardly through the evaporator 40 towards the room and is discharged through the upper grille 30 into the room. The evaporator fan 48 is surrounded by the evaporator inlet ring 50 which serves as a shroud to place the interior of the pan-shaped partition wall 46 under pressure.

Beneath the evaporator 40 is the evaporator drain pan 52 supported on insulating material. It is provided with a drain connection 54 connecting to a drain hose 56 extending down to the condensate well or trough 36. Through this drainage system, whenever any moisture is condensed from the air passing through the evaporator 40, it is collected in the pan 52 and drained through the hose 56 into the condensate receptacle 36 in the base. A sponge rubber seal 151 is provided between the pan 52 and the frame 26 to prevent leakage of the air discharged from the evaporator into the inlet side of the fan 48.

The evaporator fan 48 is mounted upon one end of a double-ended fan motor 58. The pan-shaped partition wall 46 is provided with a slight recess 60 surrounding the opening for the shaft of the evaporator fan. The recess 60 contains a resilient mounting ring or cup 62 of elastomeric material which surrounds and firmly holds the boss 64 provided at the adjacent end of the motor 58. The motor 58 is cantilever supported by a bracket which includes a ring 66 in the form of a band or strip supported by four symmetrically located L-shaped brackets 72 each having one horizontal portion welded to the ring or band 66 and the other radial portion fastened by a screw to the partition wall 46.

The shaft on the opposite end of the motor 58 supports the condenser fan 76 which is provided with a flinger or slinger ring 78 which dips into the condensate trough 36. The condenser fan 76 is surrounded by the condenser inlet ring 80 which places the compartment beneath it and the partition wall 46 under pressure to force the air outwardly through the condenser 42 and the discharge louvers 24.

The operation of the fan motor 58 rotates the fans 48 and 76 as well as the flinger ring 78 to dispose of the condensate. To use this condensate to cool the condenser 42, there is provided a water deflector 82 extending upwardly from the well or trough 36 in alignment with the flinger ring 78 at the side on which the greatest amount of water is discharged. This water deflector 82 breaks up the condensate thrown upwardly by the flinger ring 78 into fine particles which are carried upwardly by the movement of the air onto the surface of the condenser 42 where their evaporation serves to cool the condenser 42. The water collector 84 prevents splashing of the water toward the louvers 22.

A fresh air opening 86 is provided in the partition wall 46 directly behind the evaporator. It is provided with a fresh air door 88. The top of the pan-shaped partition wall 46 is provided with an exhaust air opening 123 closed by the exhaust air door 125. The exhaust air opening 123 is sealed from the outdoor air under pressure by a large thick gasket 124 of sponge rubber. This provides an enclosed exhaust passage extending from the opening 123 to the space above the inner top wall 39 leading directly to the space at atmospheric pressure on the outside of the condenser 42.

The sealed motor-compressor unit 141 and the fan motor 58 are located in the air stream flowing from the fan 76 to the condenser 42 so that it is cooled thereby. The sealed motor-compressor unit withdraws through a suction conduit 220 evaporated refrigerant from the ends of the second and third passes 219 and 221 on the rear face of the evaporator 40 and discharges the compressed gas into the condenser 42 where it is condensed by the condenser air circulating system. The compressed refrigerant is condensed in the condenser 42 and forwarded through capillary tubing 222 and branch capillary tubes 224 and 226 to the front upper and lower passes 228 and 230 of the evaporator 40. The upper bank of tubing is fed by the capillary 224 and is composed of the upper five passes of tubing of the front and middle vertical rows of passes and the two upper rows of the back or rear passes. The lower bank of tubing fed by the capillary tube 226 is composed of the three lower passes of the front and middle vertical rows of passes and the six lower passes in the rear vertical row of passes. This arrangement provides improved cooling of the air.

The sealed motor-compressor unit 141 is capable of cooling the evaporator 40 sufficiently low that it will frost. However, excessive frosting is undesirable. But on very humid days, it is desired to operate the air conditioner with the evaporator 40 maintained at as low a temperature as is possible without excessive frosting in order to remove the maximum amount of humidity. At other times it is desirable to cycle the air conditioning unit according to the temperature of the air in the room. This is provided by a thermostatic bulb 232 in the stream of air from the room flowing to the evaporator fan 48. This bulb 232 is connected by capillary tube 234 to the adjustable thermostatic switch 139 containing a sealed bellows 236 (FIGURE 3) operating a snap acting switch mechanism 238. This control 139 is provided with a temperature adjusting knob 240 for varying the tension of the return spring 242 opposing the expansion of the bellows 236 and the closing movement of the snap acting switch mechanism 238. The snap acting switch mechanism 238 normally controls the operation of the sealed motor-compressor unit 141 according to temperatures selected by the knob 240.

To prevent frosting of the evaporator 40, there is connected in series with the sealed motor-compressor unit 141 a snap acting thermostatic switch 244 which is located in the stream of air drawn from the room and discharged into the rear face of the evaporator 40 by the evaporator fan 48. It is mounted upon an L-shaped bracket 246 and is in direct heat exchange relation with the leg 248 of this bracket. This bracket also has a forked leg 250 fitting in between the fins or in between the last fin 252 and the adjacent end plate 254 which is in reality a heavier fin so that the bracket 246 is responsive to the temperature of the evaporator 40. Since the thermostat 244 is mounted in heat transfer relation with the leg 248 of the bracket 246, it is also responsive to the temperature of the evaporator 40. However, since it is mounted in the room air stream, it is also responsive to a lesser extent to the temperature of the room air stream. This thermostat 244 is set to open at temperatures which will permit the evaporator 40 to be cooled to the lowest temperature at which it can operate without the excessive forming of frost. In this particular air conditioner, the thermostat 244 is set to open at a temperature of 46° F. which will allow maximum cooling of the evaporator 40 without excessive frost formation. The thermostat 244 is set to reclose at a higher temperature, such as 64° F.

The system normally operates with the switch mechanism 238 and the thermostatic switch 244 effectively connected in series with the sealed motor-compressor unit 141 so that the opening of either will deenergize the sealed unit 141. However, under high humidity conditions, it is often desirable to keep the air conditioning unit operating at maximum capacity without reference to the room temperature. To accomplish this, the adjusting knob 240 is provided with a contact arm 254 which bridges a set of contacts 256 and 258 connecting to the supply conductor 200 and to the conductor 262 connecting with the limiter thermostatic switch 244 so as to shunt the snap acting contacts 238.

Thus, in this one position of adjustment of the knob 240, the sealed motor-compressor unit 141 will operate solely under the control of the limiter thermostatic switch 244 to achieve maximum dehumidification and operation of the air conditioning unit except when the evaporator 40 is approaching excessive frosting conditions. The thermostatic limiter switch 244, of course, prevents excessive frosting of the evaporator 40 regardless of whether the snap acting switch 248 is in effective control or is shunted by the shunt contact 254. In this way suitable control can be provided for either high humidity conditions or normal conditions by a simple adjustment.

While the embodiment of the present invention as heredisclosed, constitutes a preferred form, it is to be understood that other forms might be adopted.

What is claimed is as follows:

1. An air conditioner associated with a room to be cooled including a refrigerant evaporator having air passages and a refrigerant condenser and an electrically operated compressor connected together in an operative refrigerant circuit, fan means for circulating air from the room through said air passages into heat exchange relation with said evaporator and back into the room, an electrical circuit for supplying said compressor including a first adjustable thermostat switch responsive to the temperature of the air in said room for controlling said compressor to keep the room at comforatable temperatures, a second normally closed thermostat switch connected in said circuit in series with said compressor and said first thermostat switch and responsive to the temperature of said evaporator and the circulating air for preventing said evaporator from going below freezing temperatures and accumulating frost in said air passages, said second thermostat switch being located in the circulating air adjacent said evaporator and being set to open at an above freezing temperature and to reclose at higher temperatures.

2. An air conditioner associated with a room to be cooled including a refrigerant evaporator having air passages and a refrigerant condenser and an electrically operated compressor connected together in an operative refrigerant circuit, fan means for circulating air from the room through said air passages into heat exchange relation with said evaporator and back into the room, an electrical circuit for supplying said compressor including a first adjustable thermostat switch responsive to the temperature of the air in said room for controlling said compressor to keep the room at comfortable temperatures, a second normally closed thermostat switch connected in said circuit in series with said compressor and said first thermostat switch and responsive to the temperature of said evaporator and the circulating air for preventing said evaporator from going below freezing temperatures and accumulating frost in said air passages, said second thermostat switch being located in the circulating air adjacent said evaporator and being set to open at an above freezing temperature and to reclose at higher temperatures, said first switch also being provided with an auxiliary switch connected in shunt with it, said first switch including temperature adjustment means for operating said auxiliary switch to closed circuit position in one position and to open circuit position in another position of adjustment.

References Cited in the file of this patent

UNITED STATES PATENTS

| | | |
|---|---|---|
| 2,049,413 | Cannon | Aug. 4, 1936 |
| 2,066,235 | Smilak | Dec. 29, 1936 |
| 2,192,855 | Hastings | Mar. 5, 1940 |
| 2,419,377 | Shaw | Apr. 22, 1947 |
| 2,488,161 | Benson | Nov. 15, 1949 |
| 2,692,481 | Schweller | Oct. 26, 1954 |
| 2,752,760 | Kaufman | July 3, 1956 |